United States Patent
Choi et al.

(10) Patent No.: US 8,108,387 B2
(45) Date of Patent: Jan. 31, 2012

(54) METHOD OF DETECTING CHARACTER STRING PATTERN AT HIGH SPEED USING LAYERED SHIFT TABLES

(75) Inventors: Yoon Ho Choi, Daegu (KR); Seung Woo Seo, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 0 days.

(21) Appl. No.: 12/443,802

(22) PCT Filed: Sep. 22, 2008

(86) PCT No.: PCT/KR2008/005598
§ 371 (c)(1),
(2), (4) Date: May 11, 2010

(87) PCT Pub. No.: WO2010/013863
PCT Pub. Date: Feb. 4, 2010

(65) Prior Publication Data
US 2011/0066631 A1   Mar. 17, 2011

(30) Foreign Application Priority Data
Aug. 1, 2008   (KR) .......................... 10-2008-0075635

(51) Int. Cl.
*G06F 7/00* (2006.01)
(52) U.S. Cl. ........................... 707/730; 707/747
(58) Field of Classification Search .............. 707/769, 707/999.06, 730, 747
See application file for complete search history.

(56) References Cited

U.S. PATENT DOCUMENTS

| 5,640,575 | A | 6/1997 | Maruyama et al. |
| 2008/0097741 | A1 | 4/2008 | Bagnato et al. |
| 2008/0270399 | A1* | 10/2008 | Feng et al. .................. 707/6 |

FOREIGN PATENT DOCUMENTS

| KR | 1020050054538 | A | 6/2005 |
| KR | 1020060013815 | A | 2/2006 |
| KR | 100648297 | B1 | 11/2006 |
| KR | 100653958 | B1 | 11/2006 |

OTHER PUBLICATIONS

Wu et al, "A Fast Algorithm for Multi-Pattern Searching", May 1994, Department of Computer Science, University of Arizona, pp. 1-11.*
Notice of Allowance for Korean Patent Application No. 10-2008-0075635 which corresponds to the priority of the present U.S. Appl. No. 12/443,802.
Yoon-Ho Choi et al.'L+1-MWM: A Fast Pattern Matching Algorithm for High-Speed Packet Filtering.' In: IEEE INFOCOM 2008 Apr. 17, 2008. see abstract, section ii and algorithm.

(Continued)

*Primary Examiner* — Charles Rones
*Assistant Examiner* — Hung Havan
(74) *Attorney, Agent, or Firm* — LRK Patent Law Firm (57) ABSTRACT

A character string pattern matching method for detecting the presence of at least one of N (N is a natural number equal to or greater than 2) patterns in specific text shifts a detection location across text by a maximum shift length using single-byte character-based layered SHIFT tables, thereby increasing a pattern matching speed as compared with the prior art pattern matching algorithms.

7 Claims, 3 Drawing Sheets

OTHER PUBLICATIONS

Notification of the International Application No. and of the International Filing Date dated Sep. 29, 2008 for International Application PCT/KR2008/005598.

International Search Report dated Feb. 25, 2009 for International Application PCT/KR2008/005598.

Written Opinion of the International Searching Authority dated Feb. 25, 2009 for International Application PCT/KR2008/005598.

Notification of Transmittal of the International Search Report and the Written Opinion of the International Searching Authority, or the Declaration dated Feb. 25, 2009 for International Application PCT/KR2008/005598.

PCT Request, (Date: Sep. 22, 2008. Date provided by Applicant.)

* cited by examiner

| Index of the SHIFT tables | $a_1$ | $a_2$ | $a_3$ | $a_4$ | $a_5$ | $a_6$ | ..... |
|---|---|---|---|---|---|---|---|
| Shift values of $SHIFT_{L0}$ | 4 | 0 | 0 | 1 | 3 | 5 | 5 |
| Shift values of $SHIFT_{L1}$ | 4 | 0 | 0 | 0 | 3 | 5 | 5 |
| Index of the HASH table | ... | $a_2 a_3$ | ... | $a_3 a_2$ | ... | $a_4 a_3$ | ... |
| List of pattern candidates | — | $P_1$ | — | $P_3, P_4$ | — | $P_2$ | — |
| Index of the PREFIX table | ... | $a_1 a_5$ | — | $a_3 a_4$ | $P_3, P_5$ | ... | ... |
| List of pattern candidates | — | $P_1, P_4$ | — | $P_2$ | $P_3$ | — | — |

[Fig. 3]

METHOD OF DETECTING CHARACTER STRING PATTERN AT HIGH SPEED USING LAYERED SHIFT TABLES

TECHNICAL FIELD

The present invention relates, in general, to a method of detecting a character string pattern in text, and, more particularly, to a method of detecting a character string pattern that shifts a detection location across text by a maximum shift length using single-byte character-based layered SHIFT tables, thereby increasing a pattern matching speed as compared with the prior art pattern matching algorithms.

BACKGROUND ART

A pattern matching algorithm refers to an algorithm for detecting the presence of a desired character string pattern in specific text. Such pattern matching algorithms are classified into single pattern matching algorithms and multi-pattern matching algorithms according to the number of patterns required to be found.

The Boyer-Moore algorithm is a pattern matching algorithm that is hitherto most well known. The Boyer-Moore algorithm works relatively well when the number of patterns is one, but the performance thereof is rapidly degraded when the number of patterns becomes larger, so that this algorithm has a problem in that it is difficult to be used as a multi-pattern matching algorithm.

In order to overcome this problem, the Modified Wu-Manber (MWM) algorithm was proposed. The MWM algorithm is configured to include a preprocessing stage of creating SHIFT, HASH and PREFIX tables using a set of a plurality of patterns required to be found and a scanning stage of scanning text using the tables. Here, the SHIFT tables are used to define the number of character strings that can be skipped over in a text scanning process, and the HASH table and the PREFIX table are used to approximately determine a match with a pattern when the shift value of a relevant block is 0.

However, since the performance of the MWM algorithm is dependent on the length of the shortest of the patterns of the pattern set, this algorithm has a problem in that its performance is significantly degraded when a pattern having a short length is included in the pattern set.

In order to overcome the problem of the MWM algorithm, the $L^{+1}$-MWM algorithm was proposed. The MWM algorithm always creates a SHIFT table, a HASH table and a PREFIX table using character strings having a length of LSP on the leftmost portion of each pattern, whereas the $L^{+1}$-MWM algorithm creates tables using character strings having a length of LSP+1 on the assumption that a virtual 1 byte is present on the leftmost position of the shortest pattern.

However, the $L^{+1}$-MWM algorithm also has a problem in that it does not produce an expected speed improvement effect compared to the MWM algorithm in the case where the types of character strings present in the front portions of patterns are various. Furthermore, all of the MWM and $L^{+1}$-MWM algorithms have a fundamental limitation in that the MWM and $L^{+1}$-MWM algorithms must have small average shift values compared to algorithms using single-byte character based SHIFT tables because the MWM and $L^{+1}$-MWM algorithms are constructions using multi-byte character based SHIFT tables.

DISCLOSURE OF INVENTION

Technical Problem

Accordingly, the present invention has been made keeping in mind the above problems occurring in the prior art, and an object of the present invention is to provide a character string pattern matching method that shifts a detection location across text by a maximum shift length using single-byte character-based layered SHIFT tables, thereby increasing a pattern matching speed as compared with the prior art pattern matching algorithms.

Technical Solution

In order to accomplish the above object, the present invention provides a character string pattern matching method for detecting presence of at least one of N (N is a natural number equal to or greater than 2) patterns in specific text, including the steps of (a) calculating the length of each of the N patterns, and storing the length of the shortest thereof as the Length of a Shortest Pattern (LSP); (b) creating B (B is a natural number equal to or greater than 2) number of SHIFT tables having all 1-byte characters, which can be included in the text, as indices, and initializing values, corresponding to the respective indices of each of the B number of SHIFT tables, to the LSP; (c) creating a HASH table having hash values of all character strings having a length of B, which can be included in the text, as indices, and a PREFIX table having the respective hash values of all character strings having the length of $B_p$ ($B_p$ is a natural number equal to or greater than 2), which can be included in the text, as indices; (d) selecting any one from among the N patterns, calculating the shift values of characters at relevant locations while shifting in steps of single spaces from a leftmost location of the character string in a rightward direction across a character string ranging from 0 to location (LSP−1) if it is assumed that the location of the leftmost character of the selected pattern is 0, and updating the values of the B number of SHIFT tables; (e) for the pattern selected at the step (d), storing the value of the HASH table, having hash values for character strings, ranging from a right location of the selected pattern to location (LSP−B) to (LSP−1) of the selected pattern, as index values, as a pointer for the selected pattern; (f) for the pattern selected at the step (d), storing the value of the PREFIX table, having hash values for character strings, ranging from a left location of the selected pattern to location 0 to ($B_p$−1) of the selected pattern, as index values, as a pointer for the selected pattern; (g) repeating the steps (d) to (f) for all the N patterns; and (h) after the step (g), detecting the presence of at least one of the N patterns in the text using the B number of SHIFT tables, the HASH table and the PREFIX table.

Preferably, when each of the B number of SHIFT tables is defined as table $\text{SHIFT}_{Lj}$ (j is a natural number in a range from 0 to B−1), the step (d) includes the steps of (d-1) setting location $k_1$ in the selected pattern to 0; (d-2) extracting characters corresponding to the location $k_1$ from the selected pattern; (d-3) calculating value (LSP−1−$k_1$) of the table $\text{SHIFT}_{Lj}$ having the extracted characters as indices; (d-4) comparing the value (LSP−1−$k_1$), calculated at the step (d-3), with the current value of the table $\text{SHIFT}_{Lj}$, and updating the value of a relevant index of the table $\text{SHIFT}_{Lj}$ with a lower one of the two values; (d-5) if the value $k_1$ is identical to the value (LSP−1−j), setting the values of the table $\text{SHIFT}_{Lj}$, having characters, corresponding to the location $k_1$, as indices, to 0; (d-6) repeating the steps (d-3) to (d-5) for all the B number of SHIFT tables; and (d-7) repeating the steps (d-2) to (d-6) while increasing the value $k_1$ by one until the value $k_1$ reaches (LSP−1).

Preferably, if a previously stored pointer is present in the value of the HASH table in which the pointer is to be stored at the step (e), the previously stored pointer is not deleted, but the pointer for the selected pattern is additionally stored in a list form.

Preferably, if a previously stored pointer is present in the value of the PREFIX table in which the pointer is to be stored at the step (f), the previously stored pointer is not deleted, but the pointer for the selected pattern is additionally stored in a list form.

Preferably, when each of the B SHIFT tables is defined as table $SHIFT_{Lj}$ (j is a natural number in a range from 0 to B−1), the step (h) includes the steps of (h-1) if it is assumed that the leftmost location of the text is 0, setting a punch pointer $S_c$ at the location (LSP−1) of the text, where the punch pointer $S_c$ points to the beginning of the substring in the text, which is compared with the patterns; (h-2) extracting a shift value for a character corresponding to the location $S_c$ of the text from the table $SHIFT_{L0}$; (h-3) if the shift value extracted at the step (h-2) is 0, extracting a shift value for a character corresponding to a location ($S_c$−j) of the text from the table $SHIFT_{Lj}$ while increasing the value j from 1 to B−1 by one; (h-4) if all the shift values extracted at the step (h-3) are 0, extracting patterns, having hash values for a character string ranging from ($S_c$−B+1) to the location $S_c$ of the text as index values, from the HASH table; (h-5) if the patterns are extracted from the HASH table at the step (h-4), extracting patterns, having hash values for a character string ranging from location ($S_c$−LSP+1) to location ($S_c$−LSP+$B_p$) of the text as index values, from the PREFIX table; (h-6) if the patterns are extracted from the PREFIX table at the step (h-5), determining whether matching patterns are present between the patterns extracted from the PREFIX table and the patterns extracted from the HASH table; (h-7) if, as a result of the determination at the step (h-6), pattern candidates are present, detecting the actual presence of the patterns in the text by directly comparing the pattern candidates with the text; and (h-8) if, as a result of the determination at the step (h-7), at least one of the patterns directly compared with the text matches the text, determining that the relevant pattern is a pattern that is present in the text.

Preferably, if the shift value extracted at the step (h2) is not 0, the punch pointer $S_c$ is shifted to a right of the text by the extracted shift value, and the steps below the step (h-2) are performed based on the shifted punch pointer.

Preferably, if a shift value, other than 0, is first extracted during performance of the step (h-3), the punch pointer $S_c$ is shifted to the right of the text using the following equation, and the steps below the step (h-2) are performed based on the shifted punch pointer $S_c$:

$$S_n = S_c + \max(1, SHIFT_{L1}[*(S_c-1)]-1, \ldots, SHIFT_{Li}[*(S_c-i)]-i)$$

where $S_c$ is a punch point, $S_n$ is a next location of the punch pointer $S_c$, *($S_c$−i) is a character corresponding to location ($S_c$−i) in the text, i is a value of j at which a shift value, other than 0, is extracted, and max(a, b) is defined as '(a≧b)' and '(a<b)'

Preferably, if the patterns are not detected from the HASH table at the step (h-4), the patterns are not detected from the PREFIX table at the step (h-5), if no pattern candidates are present at the step (h-6), or if, as a result of the direct comparison at the step (h-7), it is finally determined that the pattern candidates do not match the text, the punch pointer $S_c$ is shifted to the right of the text by one, and the steps below the step (h-2) are performed based on the shifted punch pointer $S_c$.

Advantageous Effects

The present invention has an effect in that it provides a multi-pattern matching algorithm using single-byte character-based layered SHIFT tables, thus detecting the presence of patterns in text at high speed as compared with the prior art pattern matching algorithms.

The followings are examples of applied field for the present invention.

Firstly, the present invention can be applied in the field of network optimization such as Traffic monitoring for Troubleshooting, Bandwidth management and Providing a variety of QoS(Quality of Service).

Secondly, the present invention can be applied in the field of strengthening security such as Trespass detection, Spam filtering for e-mail, Firewall, Lawful intercept, Blocking harmful contents and 1P(Intellectual Property) management.

Thirdly, the present invention can be applied in the field of reducing operating cost such as Interest-based advertising, Customized pricing & Billing, Managed service.

Finally, the present invention can also be applied in the field of Searching engine, Data parsing, Data compress, Encoding/Decoding, Query, Test editor, Expletive filtering and etc.

MODE FOR THE INVENTION

Prior to a description of the present invention, it is noted that detailed descriptions of well-known functions or constructions related to the present invention will be omitted if it is determined that they may make the gist of the present invention unnecessarily obscure.

The following terms are terms that are defined in consideration of functions in the present invention, and the meanings thereof may vary according to the intention of a user or a manager or customary usage. Accordingly, the definitions of the terms should be interpreted based on the context of the entire specification.

A B-LAyered bad-character Shift Table (BLAST) algorithm according to the present invention is a method of detecting the presence of a specific character string pattern in text having a predetermined length. In the present invention, the number of character string patterns required to be found is not singular but plural (N). According to the present algorithm, it is possible to detect which of the N patterns is included in the text.

The BLAST algorithm is performed in two stages: a preprocessing stage and a scanning stage. In the following description, the detailed flow of the algorithm will be described in conjunction with the respective stages.

First, prior to the description of the present algorithm, the terms used in the description of the present invention are defined as follows:

text: a target character string in which the presence of a pattern is to be detected     pattern: a character string that is required to be searched for in text N: the number of patterns
P: a group of patterns
LSP: the length of the shortest of the N patterns 1. Preprocessing Stage The preprocessing stage is a stage of creating SHIFT tables, a HASH table and a PREFIX table using N patterns.

The SHIFT tables, the HASH table and the PREFIX table originate from the MWM algorithm, which is a prior art pattern matching algorithm. The SHIFT tables are used to define the maximum number of character strings that can be disregarded and skipped over in a process of scanning text (bad-character shift), and the HASH table and the PREFIX table are used to approximately determine which of the N patterns matches text at a current location in the case where the shift value of the SHIFT table is '0'.

The BLAST algorithm according to the present invention creates B layered bad-character SHIFT tables, unlike the prior art MWM algorithm or $L^{+1}$-MWM algorithm that uses a single multi-byte based shift table. Here, B is a natural number equal to or greater than 2, and is previously set at the time of performing the algorithm. The names of the B layered SHIFT tables are defined as $SHIFT_{Lj}$ (where $j=0, 1, \ldots, B-1$). Each SHIFT table $SHIFT_{Lj}$ is a single-byte based SHIFT table, and has an 8-bit ASCII value in a range from 0 to 255 as an index.

A process of creating the B layered bad-character SHIFT tables will be described below.

First, the length of the character string of each of the N patterns is calculated, and the length of the shortest pattern is stored as LSP.

Next, for any one of the N patterns, the value (shift value) of each index of table $SHIFT_{L0}$ is calculated while a window having a length of 1 is shifted in steps of single spaces from the leftmost location of the pattern to the location (LSP−1) thereof.

The values of the table $SHIFT_{L0}$ are calculated as described below. First, initial values for all the indices of the table $SHIFT_{L0}$ are set to LSP.

Thereafter, while a window is shifted in steps of single spaces from the leftmost location '0' of the selected pattern to the location (LSP−1) thereof the current value of the table $SHIFT_{L0}$ having a character, corresponding to a current space, as an index is compared with a value obtained by calculating (LSP−1−$k_1$), and the value of the relevant index of the table $SHIFT_{L0}$ is updated with the lower value found in the above comparison. Here, $k_1$ is a value that indicates the current location of the window ($k_1=0, 1, \ldots, LSP-1$). All the values of the table $SHIFT_{L0}$ can be calculated by repeating the above process for character strings ranging from the leftmost location of all the N patterns to the location (LSP−1) thereof.

Using the same method as was used to calculate the values of the table $SHIFT_{L0}$, a table $SHIFT_{Lj}$ ($1 \leq j \leq B-1$) is created. The table $SHIFT_{Lj}$ is different from the table $SHIFT_{L0}$ only in that, in the case of $k_1=LSP-1-j$, the values of the table $SHIFT_{Lj}$ having characters, corresponding to relative locations, as indices are set to 0.

Thereafter, the HASH table and the PREFIX table are created.

The HASH table is a table that has hash values for B character strings, ranging from the right location, as indices with respect to character strings extracted from the N patterns by LSP ranging from the leftmost location. The values of the respective indices are pointers that indicate patterns having hash values identical to the indices.

The PREFIX table is a table that has hash values for $B_p$ character strings, ranging from the leftmost location of the N patterns, as indices. The values of the respective indices are pointers that indicate patterns having hash values identical to the indices. Here, $B_p$ is a natural number equal to or greater than 2, and is a value that is previously set along with B at the time of performing the algorithm.

Since the HASH table and the PREFIX table are created using the same method as was used for the prior art MWM algorithm, a detailed description thereof will be omitted here.

Figure 1:
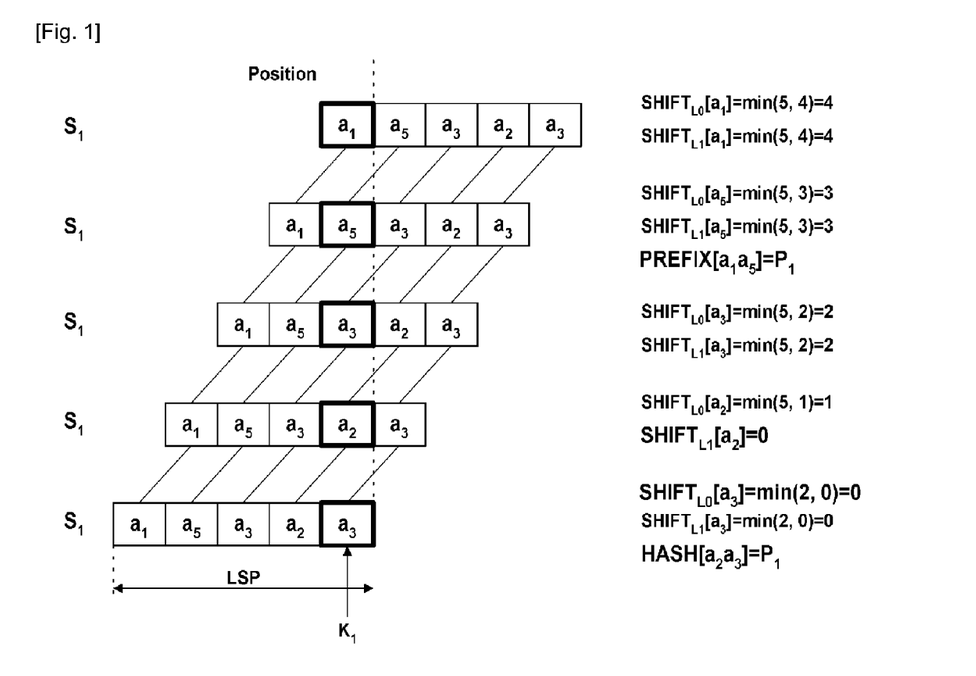
FIG. 1 is a diagram showing an example of a process of creating layered SHIFT, HASH and PREFIX tables in a preprocessing stage according to the present invention.

An example of a process of creating the layered SHIFT, HASH and PREFIX tables will be described, as shown in FIG. 1.

In order to illustrate the example of FIG. 1, it is assumed that B is set to 2 and $B_p$ is set to 2. Furthermore, it is assumed that pattern P includes four patterns $\{P_1, P_2, P_3, P_4\}$, and the respective patterns are as follows:

$P_1$='$a_1\ a_5\ a_3\ a_2\ a_3\ a_5\ a_1$'
$P_2$='$a_3\ a_4\ a_2\ a_4\ a_3\ a_3\ a_5$'
$P_3$='$a_3\ a_5\ a_4\ a_3\ a_2\ a_3$'
$P_4$='$a_1\ a_5\ a_2\ a_3\ a_2$'

In the above example, since the shortest pattern is $P_4$ and the length of $P_4$ is 5, LSP=5.

If, for ease of illustration, it is assumed that a string that ranges from the left location of each pattern of the pattern set P by LSP is extracted from the pattern of the pattern set P and the extracted strings are $S=\{S_1, S_2, S_3, S_4\}$, $S_1$='$a_1\ a_5\ a_3\ a_2\ a_3$'
$S_2$='$a_3\ a_4\ a_2\ a_4\ a_3$'
$S_3$='$a_3\ a_5\ a_4\ a_3\ a_2$'
$S_4$='$a_1\ a_5\ a_2\ a_3\ a_2$'

As shown in FIG. 1, after all the values of the tables $SHIFT_{L0}$ and SHIFT" are initialized to LSP=5, the tables $SHIFT_{L0}$ and $SHIFT_{L1}$ are created while a shift is performed in steps of single spaces from the left location to the right location with respect to $S_1$.

In the above drawing when the current location $k_1$ of the window is 0, $LSP-1-k_1=5-1-0=4$. Accordingly, since, in $S_1$, a character is $a_1$ when $k_1=0$, $SHIFT_{L0}[a_1]=\min(5, 4)=4$, and $SHIFT_{L1}[a_1]=\min(5, 4)=4$ also.

In the same manner,
when $k_1=1$, $SHIFT_{L0}[a_5]=\min(5,3)=3$, and $SHIFT_{L1}[a_5]=\min(5,3)=3$, when $k_1=2$, $SHIFT_{L0}[a_3]=\min(5,2)=2$, and $SHIFT_{L1}[a_3]=\min(5,2)=2$.

When $k_1=3$, $SHIFT_{L0}[a_2]=\min(5, 1)=1$, but $SHIFT_{L1}[a_2]=0$, as shown in the drawing. The reason for this is that $k_1=LSP-1-1=3$, as described above. That is, in the case of table $SHIFT_{Lj}$, a character at a jth location from the right location has a shift value of 0.

Meanwhile, in S1, the values of the HASH and PREFIX tables may also be set. As shown in the drawing PREFIX[$a_1\ a_5$]=$P_1$ because characters at the first $B_p$ (=2) digits of $S_1$ are $a_1\ a_5$, and HASH[$a_2\ a_3$]=$P_1$ because characters at the last B (=2) digits thereof are $a_2\ a_3$.

Figure 2:
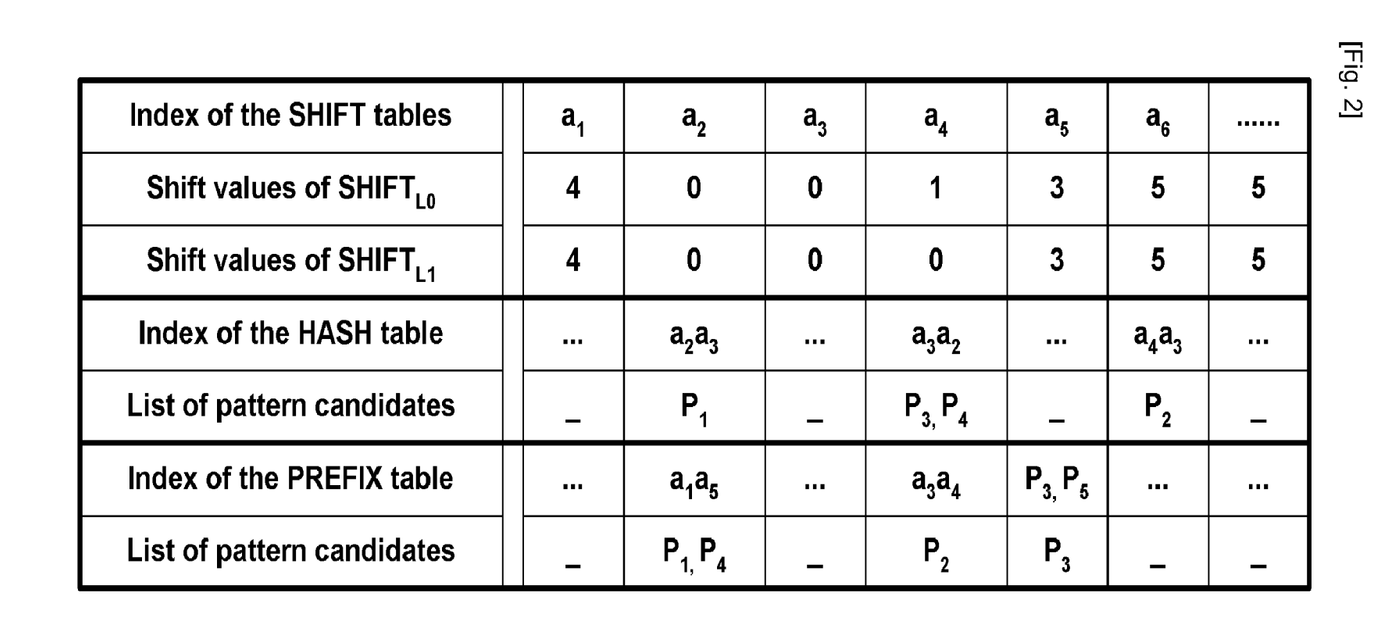
FIG. 2 is a diagram showing examples of layered SHIFT, HASH and PREFIX tables created in the preprocessing stage according to the present invention.

The table $SHIFT_{L0}$, the table SHIFT", the HASH table, and the PREFIX table obtained by repeating the above process for $S_1$ to $S_4$ are shown in FIG. 2.

2. Scanning Stage

A scanning stage is a stage of detecting the presence of patterns in text using layered SHIFT, HASH and PREFIX tables that are created at the preprocessing stage.

First, if it is assumed that 0 is located at a first left location, a punch pointer $S_c$ is set at location (LSP−1). The pointer $S_c$ indicates a reference location for pattern matching. The pointer $S_c$ is shifted to the rightmost location of text only in the rightward direction in a scanning process. If there is no matching pattern at a current location, a distance over which a shift to the right is performed is determined depending on the shift value of the layered SHIFT table, which will be described later.

Thereafter, a shift value for a character at the location of the pointer $S_c$ in the text is extracted from the table $SHIFT_{L0}$.

If, as a result of the extraction, the extracted shift value is not 0, the pointer $S_c$ is shifted to the right by a relevant value. For example, if a character corresponding to the location of the pointer $S_c$ is 'x' and $SHIFT_{L0}[x]=3$, the next location of the pointer $S_n$ is $S_c+3$. After the shifting the algorithm repeats a process of setting a new pointer $S_c$ at the resulting location and extracts a shift value from the table $SHIFT_{L0}$.

Meanwhile, if the shift value extracted from the table $SHIFT_{L0}$ is 0, a shift value for a character at a location $(S_c-1)$, that is, a location one space left of the pointer $S_c$, is extracted from the table $SHIFT_{L1}$. If a value extracted from the table $SHIFT_{L1}$ is also 0, a shift to a location one space left thereof is performed and a shift value for a character at location $(S_c-2)$ is extracted from table $SHIFT_{L2}$. In other words, it can be said that, whenever j is increased from 1 to B−1 by one, a shift value for a character corresponding to location $S_c-j$ is extracted from table $SHIFT_{Lj}$. The process is repeated until a shift value, other than 0, is first extracted from a SHIFT table or j reaches B−1.

Assume that a shift value, other than 0, is first extracted from table $SHIFT_{Li}$ ($1 \leq i \leq B-1$). Here, the pointer $S_c$ is shifted to the right based on the extracted value and the shift value is determined as follows:

$$S_n = S_c + \max(1, SHIFT_{L1}[*(S_c-1)]-1, \ldots, SHIFT_{Li}[*(S_c-i)]-i)$$

In the above equation, $S_c$ is a punch point, $S_n$ is the next location of the pointer $S_c$, $*(S_c-i)$ refers to a character at location $S_c-i$ in text, and $\max(a, b)$ is defined as '$(a \geq b)$' and '$(a<b)$'.

In the above equation, $\max(1, SHIFT_{L1}[*(S_c-1)]-1, \ldots, SHIFT_{Li}[*(S_c-i)]-i)$ is the maximum value by which a current pointer $S_c$ can be shifted to the right across text.

The pattern matching time required for text can be maximized by shifting the pointer $S_c$ by the maximum value by which the pointer $S_c$ can be shifted one time across text, using the layered SHIFT tables as described above.

Meanwhile, if all shift values in a range from the location of the pointer Sc to location (Sc−B−1) are 0, this means that there is a strong possibility that at least one of the patterns desired to be detected is present at a current location in text. In this case, whether the text approximately matches a pattern is determined using the HASH and PREFIX tables at the next step. For ease of description, assume that a character string ranging from a current pointer $S_c$ to the left by LSP is a pattern candidate that may become a matching pattern.

First, the presence of patterns that match the rightmost B character strings of the pattern candidate is detected using the HASH table, and the presence of patterns that match the leftmost $B_p$ character strings of the pattern candidate is detected using the PREFIX table.

Thereafter, whether a matching pattern (that, a pattern detected at the both steps) is present by comparing patterns detected from the HASH table with patterns detected from the PREFIX table.

If a matching pattern is present between the patterns detected from the HASH table and the patterns detected from the PREFIX table, it is determined that there is a strong possibility that the relevant pattern is present at a current location in the text, whether the relevant pattern is actually present at the current location in the text is determined by directly comparing the pattern candidates with the text, and it is finally determined that the matching pattern is present if as a result of the direct comparison, the relevant pattern is actually present in the text. However, if there is no pattern candidates between the patterns from the HASH table and the patterns detected from the PREFIX table, or if, as a result of the direct comparison, the pattern under consideration does not match text, it is then determined that a pattern desired to be searched for is not present at a current location, the pointer $S_c$ is shifted one space to the right, and the scanning stage is repeated again.

Figure 3:
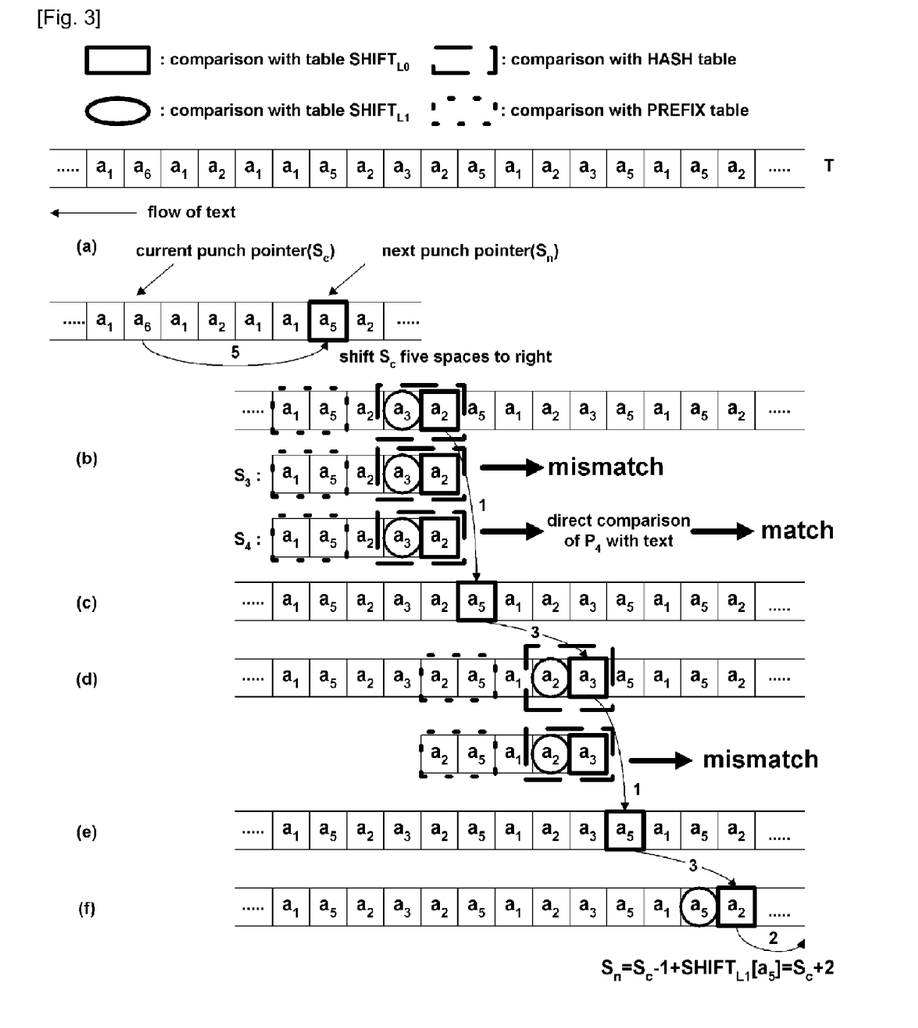
FIG. 3 is a diagram showing an example of a process of detecting the presence of a pattern in text using the layered SHIFT, HASH and PREFIX tables shown in FIG. 2 in a scanning stage according to the present invention.

An example of the scanning stage is illustrated in FIG. 3.

FIG. 3 is a diagram showing a process of detecting the presence of a set of patterns $P=\{P_1, P_2, P_3, P_4\}$ in text T using the layered SHIFT, HASH and PREFIX tables shown in FIG. 2

First, from FIG. 3(a), it can be seen that a character corresponding to a current punch pointer $S_c$ is $a_6$. Since $a_6$ is not a character that is an element of pattern P, $SHIFT_{L0}[a_6]=LSP=5$, as shown in FIG. 2, with the result that the $S_c$ is shifted five spaces to the right in this case.

Next, referring to FIG. 3(b), a character corresponding to $S_c$ is $a_2$ and a character corresponding to $S_c-1$ is $a_3$. Referring to the SHIFT table of FIG. 2, it can be seen that $SHIFT_{L0}[a_2]=0$ and $SHIFT_{L1}[a_3]=0$, and thus all shift values corresponding to right B (=2) digits are 0. Accordingly, in this case, '$a_1 \, a_5 \, a_2 \, a_3 \, a_2$' becomes a pattern candidate, and a pattern match is determined using the HASH and PREFIX tables.

Referring to the HASH table of FIG. 2, a pattern having $a_3 \, a_2$ at the last B (=2) digits thereof is $P_3$ or $P_4$. Referring to the PREFIX table, a pattern having $a_1 \, a_5$ at the first $B_p$ (=2) digits thereof is $P_1$ or $P_4$. Of these patterns, a pattern that exhibits a match in both the HASH table and the PREFIX table is $P_4$, and thus a pattern match is determined by directly comparing the pattern $P_4$ with the text. In the above example, $P_4$ is defined as '$a_1 \, a_5 \, a_2 \, a_3 \, a_2$' and thus, as a result of the performance of the algorithm, it is determined that $P_4$ is present in the text.

In the case of FIGS. 3(c) and 3(e), $SHIFT_{L0}[a_5]=3$, and thus the pointer $S_c$ is shifted three spaces to the right.

In the case of FIG. 3(d), $SHIFT_{L0}[a_3]=0$ and $SHIFT_{L1}[a_2]=0$, but, referring to the PREFIX table, there is no pattern that has $a_2 \, a_5$ at the first two digits thereof, with the result that it is finally determined that there is no matching pattern and then the pointer $S_c$ is shifted one space to the right.

In the case of FIG. 3(f), $SHIFT_{L0}[a_2]=0$ but $SHIFT_{L1}[a_5]=3$, with the result that the next position of the pointer $S_c$ is $S_c+2$ as follows:

$$S_n = S_c + \max(1, SHIFT_{L1}[a_5]-1) = S_c+3-1 = S_c+2$$

Although the specific embodiments of the present invention have been described in detail, those having ordinary skill in a technical field to which the present invention pertains may practice the present invention in other specific forms without changing the technical spirit or essential features thereof with the result that the above-described embodiments are illustrative from every aspect and it should be appreciated that the present invention is not limited to the embodiments described in the detailed description of the invention. The scope of the right of the present invention is defined by the following claims, rather than the detailed description of the invention, and it should be appreciated that all variations or modifications derived from the meaning range and equivalents of the claims fall within the scope of the present invention.

The invention claimed is:

1. A character string pattern matching, method recorded on a non-transient computer-readable medium for detecting presence of at least one of N, wherein N is a natural number equal to or greater than 2, patterns in specific text, comprising the steps of:
   (a) calculating a length of each of the N patterns, and storing a length of a shortest one thereof as a Length of a Shortest Pattern (LSP);
   (b) creating B, wherein B is a natural number equal to or greater than 2, number of SHIFT tables having all 1-byte characters, which are included in the text, as indices, and initializing values, corresponding to respective indices of each of the B number of SHIFT tables, to the LSP;
   (c) creating a HASH table having hash values of all character strings having a length of B, which are included in the text, as indices, and a PREFIX table having respective hash values of all character strings having a length of Bp, wherein Bp is a natural number equal to or greater than 2, which are included in the text, as indices;
   (d) selecting any, one from among the N patterns, calculating shift values of characters at relevant locations while shifting in steps of single spaces from a leftmost location of the character string in a rightward direction across a character string ranging from 0 to location (LSP−1) if a location of a leftmost character of the selected pattern is 0, and updating values of the B number of SHIFT tables;
   (e) for the pattern selected at the step (d), storing a value of the HASH table, having hash values for character strings, ranging from a right location of the selected pattern to location (LSP−B) to (LSP−1) of the selected pattern, as index values, as a pointer for the selected pattern;
   (f) for the pattern selected at the step (d), storing a value of the PREFIX table, having hash values for character strings, ranging from a left location of the selected pattern to location 0 to (Bp−1) of the selected pattern, as index values, as a pointer for the selected pattern;
   (g) repeating the steps (d) to (f) for all the N patterns; and
   (h) after the step (g), detecting presence of at least one of the N patterns in the text using the B number of SHIFT tables, the HASH table and the PREFIX table,
   wherein, when each of the B SHIFT tables is defined as the table $SHIFT_{Lj}$ wherein j is a natural number in a range from 0 to B−1,
   the step (d) comprises the steps of:
   (d-1) setting location $k_1$ in the selected pattern to 0;
   (d-2) extracting characters corresponding to the location $k_1$ from the selected pattern;
   (d-3) calculating value (LSP−1−$k_1$) of the table $SHIFT_{Lj}$ having the extracted characters as indices;
   (d-4) comparing the value (LSP−1−$k_1$), calculated at the step (d-3), with a current value of the table $SHIFT_{Lj}$, and updating a value of a relevant index of the table $SHIFT_{Lj}$ with a lower one of the two values;
   (d-5) if the value $k_1$ is identical to the value (LSP−1−j), setting values of the table $SHIFT_{Lj}$, having characters, corresponding to the location $k_1$, as indices, to 0;
   (d-6) repeating the steps (d-3) to (d-5) for all the B number of SHIFT tables; and
   (d-7) repeating the steps (d-2) to (d-6) while increasing the value $k_1$ by one until the value $k_1$ reaches (LSP−1).

2. The character string pattern matching method recorded on the computer-readable medium as set forth in claim 1, wherein, if a previously stored pointer is present in the value of the HASH table in which the pointer is to be stored at the step (e), the previously stored pointer is not deleted, but the pointer for the selected pattern is additionally stored in a list form.

3. The character string pattern matching method recorded on the computer-readable medium as set forth in claim 1, wherein if a previously stored pointer is present in the value of the PREFIX table in which the pointer is to be stored at the step (f), the previously stored pointer is not deleted, but the pointer for the selected pattern is additionally stored in a list form.

4. The character string pattern matching method recorded on the computer-readable medium as set forth in claim 1, wherein, when each of the B SHIFT tables is defined as table $SHIFT_{Lj}$, wherein j is a natural number in a range from 0 to B−1,
   the step (h) comprises the steps of:
   (h-1) if a leftmost location of the text is 0, setting a punch pointer $S_c$ at a location (LSP−1) of the text;
   (h-2) extracting a shift value for a character corresponding to the location $S_c$ of the text from the table $SHIFT_{L0}$;
   (h-3) if the shift value extracted at the step (h-2) is 0, extracting a shift value for a character corresponding to location ($S_c$−j) of the text from the table $SHIFT_{Lj}$ while increasing the value j from 1 to B−1 by one:
   (h-4) if all the shift values extracted at the step (h-3) are 0, extracting patterns, having hash values for a character string ranging from ($S_c$−B+1) to the location $S_c$ of the text as index values, from the HASH table;
   (h-5) if the patterns are extracted from the HASH table at the step (h-4), extracting patterns, having hash values for a character string ranging from location ($S_c$−LSP+1) to location ($S_c$−LSP+Bp) of the text as index values, from the PREFIX table;
   (h-6) if the patterns are extracted from the PREFIX table at the step (h-5), determining whether pattern candidates are present between the patterns extracted from the PREFIX table and the patterns extracted from the HASH table;
   (h-7) if, as a result of the determination at the step (h-6), pattern candidates are present, detecting actual presence of the patterns in the text by directly comparing the pattern candidates with the text; and
   (h-8) if, as a result of the determination at the step (h-7), at least one of the patterns directly compared with the text matches the text, determining that the relevant pattern is a pattern that is present in the text.

5. The character string pattern matching method recorded on the computer-readable medium as set forth in claim 4, wherein, if the shift value extracted at the step (h-2) is not 0, the punch pointer Sc is shifted to the right of the text by the extracted shift value, and the steps below the step (h-2) are performed based on the shifted punch pointer.

6. The character string pattern matching method recorded on the computer-readable medium as set forth in claim 4, wherein, if a shift value, other than 0, is first extracted during performance of the step (h-3), the punch pointer $S_c$ is shifted to a right of the text using the following equation, and the steps below the step (h-2) are performed based on the shifted punch pointer $S_c$;

$S_n = S_c + \max(1, SHIFT_{L1}[*(S_c-1)]-1, \ldots, SHIFT_{Li}[*(S_c-i)]-i)$ where $S_c$ is a punch point, $S_n$ is a next location of the punch pointer $S_c$, $*(S_c-i)$ is a character corresponding to location ($S_c$−i) in the text, i is a value of j at which a shift value, other than 0, is extracted, and max(a, b) is defined as '(a≧b)' and '(a<b)'.

7. The character string pattern matching method recorded on the computer-readable medium as set forth in claim 4, wherein, if the patterns are not detected from the HASH table at the step (h-4), if the patterns are not detected from the PREFIX table at the step (h-5), if no pattern candidates are present at the step (h-6), or if, as a result of the direct comparison at the step (h-7), the pattern candidates do not match the text, the punch pointer $S_c$ is shifted to a right of the text by one, and the steps below the step (h-2) are performed based on the shifted punch pointer $S_c$.

* * * * *